(12) United States Patent
Asano

(10) Patent No.: US 8,667,233 B2
(45) Date of Patent: Mar. 4, 2014

(54) COMPETITION TESTING DEVICE

(75) Inventor: Yasushi Asano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 223 days.

(21) Appl. No.: 13/208,506

(22) Filed: Aug. 12, 2011

(65) Prior Publication Data

US 2012/0210101 A1 Aug. 16, 2012

(30) Foreign Application Priority Data

Aug. 17, 2010 (JP) .................................. 2010-182152

(51) Int. Cl.
*G06F 12/00* (2006.01)

(52) U.S. Cl.
USPC ......................................................... 711/154

(58) Field of Classification Search
None
See application file for complete search history.

(56) References Cited

U.S. PATENT DOCUMENTS

| | | | |
|---|---|---|---|
| 6,519,765 B1* | 2/2003 | Kawahito et al. | 717/127 |
| 2004/0230765 A1* | 11/2004 | Funahashi et al. | 711/201 |
| 2011/0238900 A1* | 9/2011 | Heo et al. | 711/103 |

FOREIGN PATENT DOCUMENTS

JP 2008-134807 A 6/2008

* cited by examiner

*Primary Examiner* — Brian Peugh
(74) *Attorney, Agent, or Firm* — Fujitsu Patent Center

(57) ABSTRACT

A competition testing apparatus for testing an access competition of an arithmetic unit includes a memory that stores a program, a first processor that executes the program by accessing the memory, a second processor that executes the program by accessing the memory, and an arbitration unit that arbitrates accessing the first processor and the second processor and reports a result of the arbitration upon the first processor and the second processor accessing the same address space in the memory, wherein the memory stores a odd number of programs, further comprises a controller that controls the first processor to process the plurality of test programs stored in the storage in predetermined order, and controls the second processor to process the plurality of test programs stored in the storage in order reverse to the predetermined order, and a recording unit that records the result of arbitration performed using the arbitrator.

6 Claims, 5 Drawing Sheets

FIG. 5A

CPU4: 1000, 1020, 1040, 1080, 10A0, 10C0, ...

CPU5: 2000, 1FE0, 1FC0, 1FA0, 1F80, 1F60, ...

FIG. 5B

CPU4: ..., 17C0, 17E0, 1800, 1820, 1840, 1860, ...

CPU5: ..., 1840, 1820, 1800, 17E0, 17C0, 17A0, ...

T

COMPETITION TESTING DEVICE

CROSS-REFERENCE TO RELATED APPLICATION

This application is based upon and claims the benefit of priority of the prior Japanese Patent Application No. 2010-182152 filed on Aug. 17, 2010, the entire contents of which are incorporated herein by reference.

FIELD

The embodiment discussed herein is relates to a competition testing apparatus that tests an arbitrating operation to be performed when an access competition has occurred.

BACKGROUND

An arithmetic unit that executes a numerical arithmetic process is expected to process more complicated arithmetic operations at a higher speed than ever. In some cases, the arithmetic unit may include a plurality of arithmetic sections such as, for example, CPUs (Central Processing Units) in order to meet the requirements for higher speed processing of arithmetic operations. The arithmetic unit is allowed to process a plurality of arithmetic operations in parallel using the plurality of CPUs.

A program that the arithmetic unit executes is stored in a storage such as a memory or the like. In some case, a plurality of arithmetic sections may share one storage. When the plurality of arithmetic sections intend to simultaneously read out the program stored in the same address space in the storage that the plurality of arithmetic sections share, an access competition may occur. A circuit that arbitrates access order in accordance with a rule which has been defined in advance when the access competition has occurred is called an arbitrator circuit. The plurality of arithmetic sections is allowed to continuously execute the program with no error even when the competition has occurred by accessing to the storage via the arbitrator circuit.

As a device for testing whether the arbitrator circuit arbitrates the access order in accordance with the rule which has been defined in advance, a competition testing apparatus is proposed. The competition testing apparatus falsely makes a competition occur using the arbitrator circuit and evaluates the operation of the arbitrator circuit upon occurrence of the access competition.

In some cases, the length of wiring between one arithmetic section and the storage may be different from the length of wiring between another arithmetic section and the storage. A lag in dummy timing which is caused by the difference in wiring length increases with reducing a cycle of a signal in which it propagates from each arithmetic section to the storage. In the case that the lag in timing is large, it may become difficult to control the access from each arithmetic section to the storage so as to make the access competition occur using the arbitrator circuit.

A technique relating to installing false access signal generating means for falsely making an access competition occur is disclosed in Japanese Laid-open Patent Publication No. 2008-134807. It may become possible to favorably make the access competition occur owing to installation of the false access signal generating means.

SUMMARY

According to an aspect of the embodiment, a competition testing apparatus for testing an access competition of an arithmetic unit includes a memory that stores a program, a first processor that executes the program by accessing the memory, a second processor that executes the program by accessing the memory, and an arbitration unit that arbitrates accessing the first processor and the second processor and reports a result of the arbitration upon the first processor and the second processor accessing the same address space in the memory, wherein the memory stores a odd number of programs, further comprises a controller that controls the first processor to process the plurality of test programs stored in the storage in predetermined order, and controls the second processor to process the plurality of test programs stored in the storage in order reverse to the predetermined order, and a recording unit that records the result of arbitration performed using the arbitrator.

The object and advantages of the embodiment will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A and FIG. 5B are diagrams illustrating examples of timing charts explaining occurrence of an access competition between two CPUs.

DESCRIPTION OF EMBODIMENTS

In the following, preferred embodiments will be described. Incidentally, combinations of configurations in the respective embodiments may be also included in the embodiments of the present invention.

Figure 1:
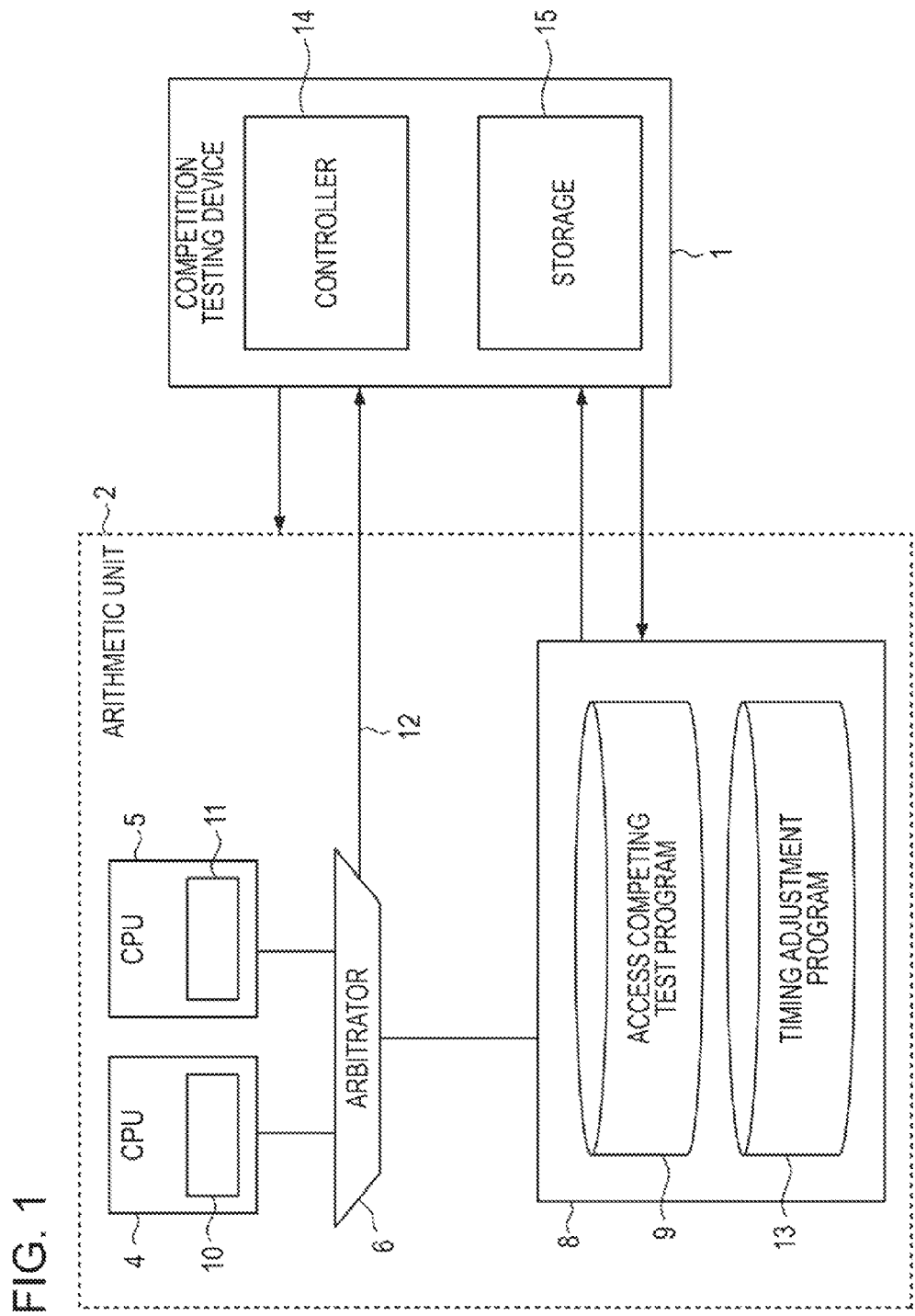
FIG. 1 is a block diagram illustrating examples of a competition testing apparatus and an arithmetic unit.

FIG. 1 is a block diagram illustrating examples of a competition testing apparatus 1 that executes an access competing test and an arithmetic unit 2 to be subjected to the competing test. The competition testing apparatus 1 puts the arithmetic unit 2 to the access competing test. The competition testing apparatus 1 includes a controller 14 that controls arithmetic processing operations of the arithmetic unit 2, and a storage 15 that stores programs to be executed using the controller 14.

The arithmetic unit 2 includes a CPU 4, a CPU 5, an arbitrator 6 and a memory 8. The memory 8 is an example of a storage that divides an address space into an odd number of memory blocks to store the respective programs into the respective memory blocks. The CPUs 4 and 5 are examples of an arithmetic section that makes a program read request (a request that the programs be read out) to the memory 8. The arbitrator 6 arbitrates a program transmitting process in response to the program read requests that simultaneously designate the same address space in the storage.

The competition testing apparatus 1 makes the memory 8 store test programs used to test the arbitrating operation of the arbitrator 6 respectively into an odd number of address spaces thereof. The competition testing apparatus 1 makes the CPU 4 request to read out the plurality of test programs stored in the memory 8 in predetermined order. The competition testing apparatus 1 makes the CPU 5 request to read out the plurality of test programs stored in the memory 8 in order reverse to the predetermined order. The competition testing apparatus 1 makes the arbitrator 6 arbitrate a test program transmitting process to be performed in response to the program read requests which have been simultaneously made to the same address space in the memory 8. The competition testing apparatus 1 records the arbitrating operation of the arbitrator 6. The reason why the address space is divided into an odd number of memory blocks as described above lies in that if the address space is divided onto an even number of memory blocks, a timing at which the CPU 4 and the CPU 5 do not simultaneously access to the same memory block may be generated even when the CPU 4 and the CPU 5 make the program read requests in mutually reverse orders. Division of the address space into an odd number of memory blocks favorably allows an access competition to occur in the case that the CPU 4 and the CPU 5 make the program read requests in mutually reverse orders. The details of the access competition will be described later.

The competition testing apparatus 1 makes the CPU 4 and the CPU 5 access to the memory 8 via the arbitrator 6. The CPU 4 and the CPU 5 make requests that the programs stored in the memory 8 be read out. The CPU 4 includes a cache memory 10. The CPU 5 includes a cache memory 11. Each of the CPUs 4 and 5 temporarily stores the read-out programs into each of their cache memories 10 and 11. The cache memories 11 and 11 are examples of a temporal storage unit that temporarily stores read-out programs. Each of the CPUs 4 and 5 executes the programs which are temporarily stored in each of their cache memories 10 and 11.

Each of the CPU 4 and the CPU 5 reads a frequently used program out of each of the cache memories 10 and 11 to reduce the number of accesses to the memory 8. In the case that the capacitance value of each of their cache memories 10 and 11 is equal to or larger than the size of a program that each of the CPUs 4 and 5 intends to read out of the memory 8 a plurality of number of times, each of the CPUs 4 and 5 executes the program which is temporarily stored in each of their cache memories 10 and 11. In the case that the program that each of the CPUs 4 and 5 intends to read out of the memory 8 is the same as the program which is temporarily stored in each of their cache memories 10, 11, each of the CPUs 4 and 5 does not read the program out of the memory 8 and executes the program which is temporarily stored in each of their cache memories 10 and 11.

In the case that the size of the program that each of the CPUs 4 and 5 intends to read out of the memory 8 is larger than the capacitance value of each of their cache memories 10 and 11, it may become difficult for each of the cache memories 10 and 11 to store the program to be executed. In the above mentioned situation, even when the same program is to be executed a plurality of number of times, each of the CPUs 4 and 5 makes the test program read request to the memory 8 every time the program is executed. The memory 8 bursttransmits the test program in response to the test program read request made from each of the CPUs 4 and 5. Thus, it may become possible to burst-transmit the test program every time an instruction that the test program be read out is given by setting the capacitance value of the test program to be stored into the memory 8 larger than the capacitance values of the cache memories 10 and 11.

The arbitrator 6 arbitrates execution of a process of bursttransmitting the test program reading-out of which is requested from the CPUs 4 and 5. In the case that the CPUs 4 and 5 have simultaneously designated the same memory block in the memory 8 in their program read requests, the access competition may occur. The arbitrator 6 executes an arbitrating process which has been set in advance in the case that the access competition has occurred. For example, the arbitrator 6 sets to give priority to the program read request from the CPU 4 in the case that the access competition has occurred. In the above mentioned case, the competition testing apparatus 1 makes the arbitrator 6 output a competition signal 12 conforming to a result of arbitration to the competition testing apparatus 1. The competition testing apparatus 1 records the received competition signal 12 into the storage 15. For example, the competition signal 12 is a logical signal and indicates a logical value "1" in the case that the access competition does not occur and indicates a logical value "0" in the case that the access competition has occurred. The competition testing apparatus 1 records an arbitrating operation of the arbitrator 6 into the storage 15. The arbitrating operation is the execution procedure of the arbitrating process to be executed using the arbitrator 6 when the access competition has occurred. The arbitrating operation is incorporated in advance as a process to be executed using the arbitrator 6 upon occurrence of the access competition. The competition testing apparatus 1 is allowed to specify an access competition occurring timing in the arbitrator 6 by recording a time change of the competition signal 12 when the access competition has occurred into the storage 15. It may become possible to confirm whether the arbitrator 6 performs the arbitrating operation as designed by analyzing the operation of the arbitration section 6 which has been recorded into the storage 15 at the specified access competition occurring timing.

The memory 8 stores an access competing test program 9 and a timing adjustment program 13. The access competing test program 9 and the timing adjustment program 13 are stored in the storage 15 of the competition testing apparatus 1. In the competition testing apparatus 1, the controller 14 writes the access competing test program 9 and the timing adjustment program 13 stored in the storage 15 into the memory 8.

The access competing test program 9 is a program used to make the CPUs 4 and 5 read out and execute it in order to make the access competition occur in the arbitrator 6. The competition testing apparatus 1 monitors timings at which the CPUs 4 and 5 make requests that the access competing test program 9 be read out and timings at which the CPUs 4 and 5 terminate execution of the access competing test program 9. The details of the access competing test program 9 will be described later.

The timing adjustment program 13 is a dummy arithmetic program used to adjust the timings at which the CPU 4 and the CPU 5 read the access competing test program 9 out of the memory 8. The controller 14 of the competition testing apparatus 1 makes the CPU 4 or the CPU 5 execute the timing adjustment program 13 for timing adjustment. The controller 14 makes the CPU 4 execute the timing adjustment program 13 before the CPU 4 reads out the access competing test program 9. As a result, the timing at which the CPU 4 reads out the access competing test program 9 is delayed from the timing at which the CPU 5 reads out the access competing test program 9 by a time taken to execute the timing adjustment program 13. The specific procedures of an execution timing adjusting process are as follows.

In the competition testing apparatus 1, the controller 14 records the operating statuses of the CPU 4 and the CPU 5 into the storage 15. The controller 14 records the timings at which the CPUs 4 and 5 make requests that the access competing test program 9 be read out and the timings at which the CPU 4 and the CPU 5 terminate execution of the access competing test program 9 into the storage 15. The controller 14 calculates a lag in the execution timing between the CPUs 4 and 5 on the basis of the recorded timings at which the CPUs 4 and 5 make requests that the access competing test program 9 be read out and the recorded timings at which the CPUs 4 and 5 terminate execution of the access competing test program 9.

The timing adjustment program 13 is a program into which repeated frequency of a simple dummy arithmetic operation such as the four arithmetic operation may be set from the outside. The controller 14 of the competition testing apparatus 1 designates executed frequency of an arithmetic process in the timing adjustment program 13 on the basis of the calculated lag in the execution timing between the CPUs 4 and 5.

As described above, the competition testing apparatus 1 is allowed to execute an access competing test when the requests that the access competing test program 9 be read out are made by shifting the timing at which either one of the CPUs has made the program read request on the basis of a result of monitoring of the timings at which the CPUs 4 and 5 have made the access competing test program read requests and the timings at which the CPUs 4 and 5 terminate execution of the access competing test program.

The control section 14 of the competition testing apparatus 1 shifts from each other the timings at which the CPU 4 and the CPU 5 make the requests that the access competing test program 9 be read out until the competition signal 12 indicating occurrence of the access competition is output from the arbitrator 14. When the competition signal 12 indicating occurrence of the access competition is received, the controller 14 terminates execution of the access competing test. After execution of the access competing test has been terminated, the controller 14 is allowed to check whether the arbitrator 6 has executed the arbitrating operation which has been set in advance by confirming an execution log of the arbitrating operation which is recorded in the storage 15.

It may become possible to provide the competition testing apparatus 1 that favorably makes the access competition occur by controlling the arithmetic unit 2 as mentioned above with no installation of the false access signal generating means.

Figure 2:
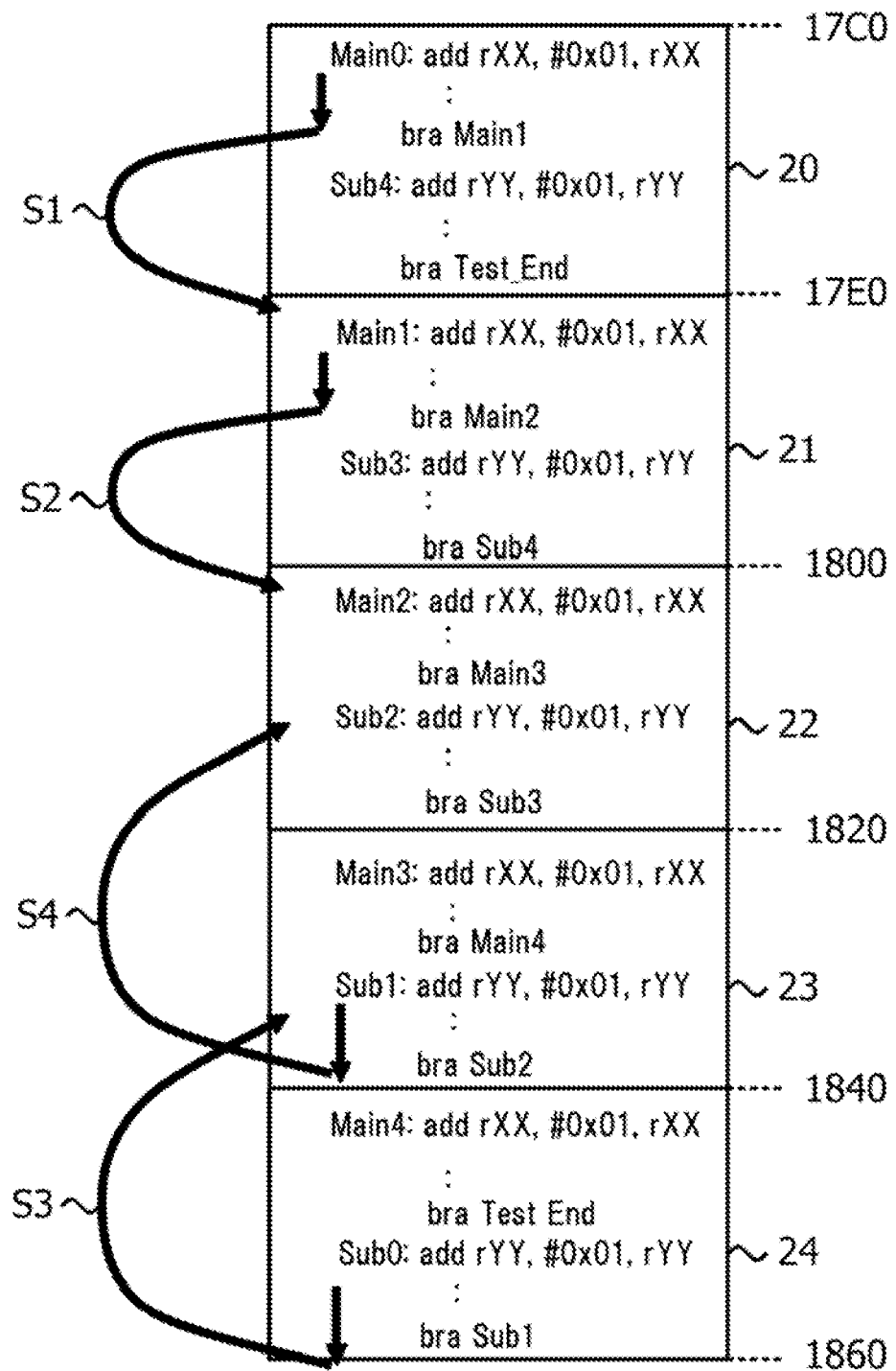
FIG. 2 is a diagram illustrating an example of a memory map of an access competing test program used to make an access competition occur.

FIG. 2 is a diagram illustrating an example of a memory map of the access competing test program 9 used to make the access competition occur. The access competing test program 9 includes a plurality of test programs. The memory 8 is divided into an odd number of memory blocks including fixed address spaces as described above. A memory block 20 corresponds to addresses 17C0 to 17E0 of the memory 8. A memory block 21 corresponds to addresses 17E0 to 1800 of the memory 8. A memory block 22 corresponds to addresses 1800 to 1820 of the memory 8. A memory block 23 corresponds to addresses 1820 to 1840 of the memory 8. A memory block 24 corresponds to addresses 1840 to 1860 of the memory 8.

The memory blocks respectively store arithmetic programs to be executed using the CPU 4 and the CPU 5. In the embodiment, in the access competing test program 9, the programs that the CPU 4 requests to read out are stored in order reverse to order in which the CPU 5 requests to read out the programs.

In the embodiment, the CPU 4 reads out the arithmetic programs in order of the memory blocks 20, 21, 22, 23 and 24. On the other hand, the CPU 5 reads out the arithmetic programs in order of the memory blocks 24, 23, 22, 21 and 20. That is, the program read order of the CPU 5 is set to be reverse to the program read order of the CPU 4. In the embodiment, one arithmetic program which is stored in one memory block includes the step of jumping to another arithmetic program which is stored in another memory block. Therefore, for example, if the CPU 4 reads out and executes the arithmetic program which is stored in the memory block 20, the CPU 4 will be allowed to automatically read out another arithmetic program which is stored in the memory block 21.

The size of each memory block is larger than the cache size of each of the CPUs 4 and 5. The sizes of the respective memory blocks may be the same as one another. Making the size of each memory block larger than the cache size of each of the CPUs 4 and 5 may lead to occurrence of a cache error when the CPU 4 or 5 reads out one memory block and hence the memory 8 may burst-transmit the test program to each of the CPUs 4 and 5. In the following, the details of a reading-out operation performed using each of the CPUs 4 and 5 will be described.

The CPU 4 executes the access competing test program 9 as follows. First, the CPU 4 reads out the memory block 20. The CPU 4 executes a "Main0" function of the read-out memory program 20. The CPU 4 executes an arithmetic program described in the "Main0" function. The CPU 4 executes "bra Main1" on the last line of the "Main 0" function. The "bra Main1" is an instruction that a "Main1" function be read out. The CPU 4 reads out the memory block 21 in which the "Main1" function is described (step S1).

The CPU 4 executes the "Main1" function in the memory block 21 as in the memory block 20. The CPU 4 executes an arithmetic program described in the "Main1" function. The CPU 4 executes "bra Main2" in the last line of the "Main1" function. The CPU 4 reads out the memory block 22 in which a "Main2" function is described (step S2). The CPU 4 executes the arithmetic process on the memory blocks 23 and 24 in the same manner as the above. The CPU 4 executes a "Test End" command described in the memory block 24 to terminate execution of the arithmetic process.

The CPU 5 executes the access competing test program 9 as follows. First, the CPU 5 reads out the memory block 24. The CPU 5 executes a "Sub0" function in the read-out memory block 24. Since "bra Sub1" is described in the last line of the "Sub0" function, the CPU 5 reads out the memory block 23 in which a "Sub1" function is described (step S3).

The CPU 5 executes the "Sub1" function in the memory block 23 as in the memory block 24. The CPU 5 executes an arithmetic program described in the "Sub1" function. The CPU 5 executes "bra Sub2" in the last line of the "Sub1" function. The CPU 5 reads out the memory block 22 in which a "Sub2" function is described (step S4). The CPU 5 executes the arithmetic process on the memory blocks 21 and 20 in the same manner as the above. The CPU 5 executes a "Test End" command described in the memory block 20 to terminate execution of the arithmetic process.

If the arithmetic process sizes of functions to be subjected to the arithmetic process in the respective memory blocks are the same as one another and the throughputs of the CPUs 4 and 5 are the same as each other, the CPUs 4 and 5 will simultaneously read out the memory block 22 which is positioned at the center of the program both in ascending order and descending order in the memory blocks 20, 21, 22, 23 and 24.

Even when the throughputs of the CPU 4 and the CPU 5 are not the same as each other, the competition testing apparatus 1 is allowed to put program reading-out to the CPU 4 into competition with program reading-out to the CPU 5 in reading out of any one of the memory blocks 20, 21, 22, 23 and 24. The access competing test program 9 includes an odd number of memory blocks. Thus, the competition testing apparatus 1 adjusts timings such that the CPU 4 starts reading-out of the access competing test program 9 before the CPU 5 terminates reading-out of the access competing test program 9. Since an odd number of memory blocks are included in the program, the program reading-out process executed using the CPU 4 competes with the program reading-out process executed using the CPU 5 in reading out of any one of the memory blocks 20, 21, 22, 23 and 24.

It may become possible to provide the competition testing apparatus 1 that favorably makes the access competition occur by reading out an odd number of memory blocks using the CPU 5 in order reverse to order in which the CPU 4 reads out the memory blocks.

Figure 3:
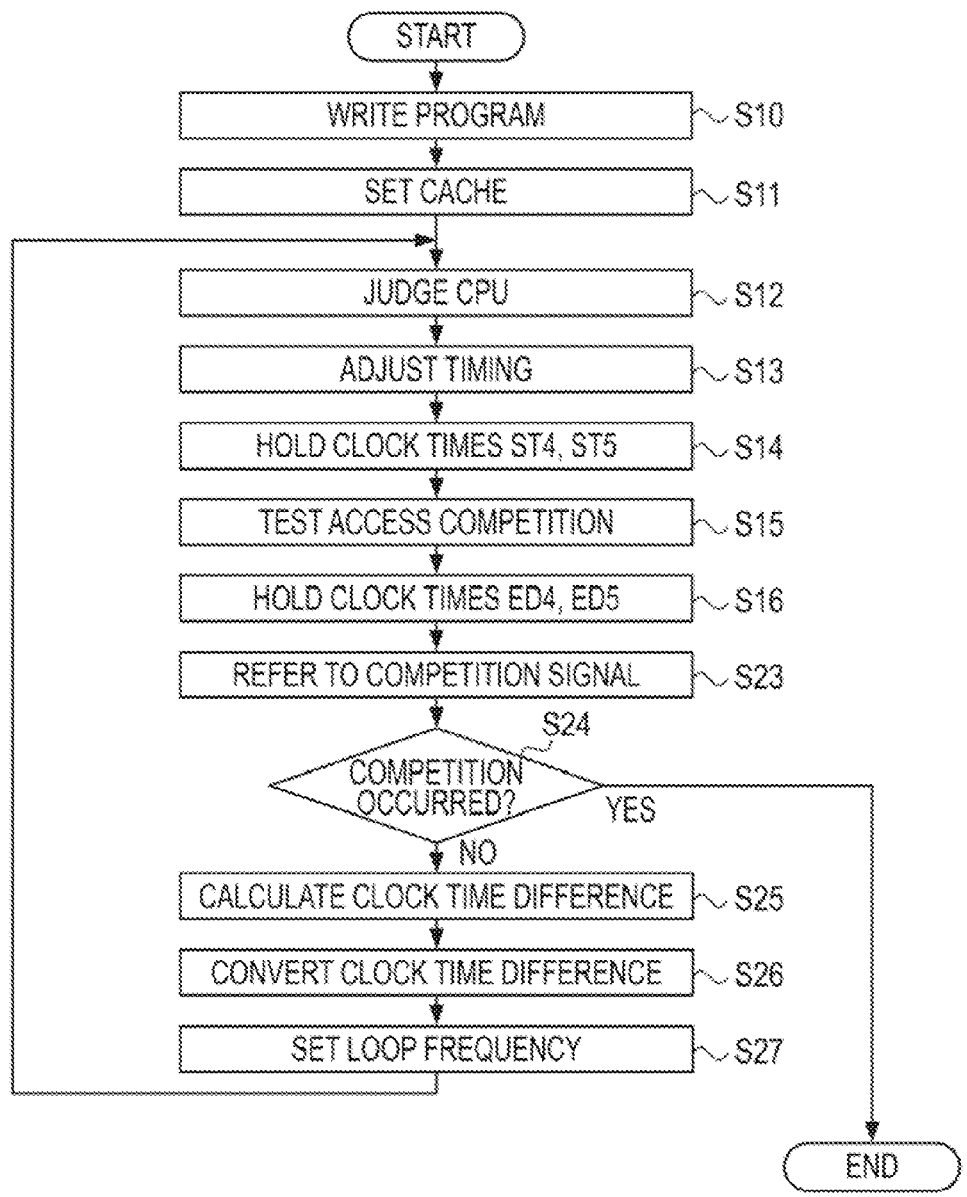
FIG. 3 is a diagram illustrating an example of a flowchart of an access competition testing process executed using a test controller.

FIG. 3 is a diagram illustrating an example of a flowchart of an access competition testing process executed using the competition testing apparatus 1. The competition testing apparatus 1 writes the access competing test program 9 and the timing adjustment program 13 into the storage 8 of the arithmetic unit 2 (S10). The competition testing apparatus 1 sets the caches of the CPUs 4 and 5 such that instruction caching is made effective (S11). Burst transmission occurs when the size of one memory block that each CPU reads out exceeds the cache size of each CPU by making the instruction caching effective.

Each of the CPUs 4 and 5 includes a register area that stores a CPUID for identifying each CPU. A read request which is output from each of the CPUs 4 and 5 includes the CPUID which is stored in the register area. When the read request is made, the competition testing apparatus 1 acquires the CPUID from the read request. The competition testing apparatus 1 judges which CPU, the CPU 4 or the CPU 5, has made the read request first on the basis of the acquired CPUID (S12). The competition testing apparatus 1 is allowed to record execution order of the CPUs 4 and 5 by acquiring the CPUID before execution of the access competing test is started.

The competition testing apparatus 1 makes the CPU 4 or 5 which has been judged to make the read request first execute the timing adjustment program 13 (S13). Since in some cases, timing adjustment may not be needed, for example, when the throughputs of the CPUs 4 and 5 are the same as each other, the initial value of a timing adjustment time which is obtained in accordance with the timing adjustment program 13 is zero. The competition testing apparatus 1 holds a clock time ST4 of the CPU 4 and a clock time ST5 of the CPU 5 at which the CPUs 4 and 5 have made the requests that the access competing test program 9 be read out with reference to a system clock (S14). The system clock is counted using, for example, a counter. The competition testing apparatus 1 refers to the count value of the counter. The competition testing apparatus 1 that has held the clock times ST4 and ST5 makes the CPU4 and the CPU 5 execute the access competing test program 9 which has been read out in accordance with the program read requests (S15). The competition testing apparatus 1 keeps recording the competition signals 12 received from the arbitrator 6 while the access competing test program 9 is being executed. After execution of the access competing test program 9 has been terminated, the CPU 4 and the CPU 5 notify the competition testing apparatus 1 of termination of execution of the access competing test program 9. The competition testing apparatus 1 holds a clock time ED4 of the CPU 4 and the clock time ED5 of the CPU 5 which are counted from the system clock as a reference upon termination of execution of the access competing test program 9 (S16).

After the clock times ED4 and ED5 have been stored, the competition testing apparatus 1 refers to the stored competition signal 12 (S23). In the case that a logical value indicating the access competition has been detected in the stored competition signal 12 (S24: YES), the competition testing apparatus 1 judges that the access competition has occurred in the arbitrator 6 and terminates execution of the access competing test. In the case that the logical value indicating the access competition is not detected in the stored competition signal 12 (S24: NO), the competition testing apparatus 1 calculates an absolute value (ST5–ST4) of a difference value between the clock time ST4 and the clock time ST5 (S25).

The competition testing apparatus 1 stores a time T which is taken for one-time execution of the timing adjustment program 13 using the CPU 4. The competition testing apparatus 1 divides the absolute value (ST5–ST4) of the difference value by the time T to convert the difference value between the clock times to loop frequency N of the timing adjustment program 13 (S26). The competition testing apparatus 1 sets the converted loop frequency N=(ST5–ST4)/T as the loop frequency of the timing adjustment program 13 (S27). The competition testing apparatus 1 judges to which CPU it makes to execute the timing adjustment program 13 on the basis of a relation in magnitude between the clock times ST4 and ST5. Specifically, in the case that N is a negative number, that is, ST4 is larger than ST5, the competition testing apparatus 1 makes the CPU 5 execute the timing adjustment program 13. In the case that N is a positive number, that is, ST4 is smaller than ST5, the competition testing apparatus 1 makes the CPU 4 execute the timing adjustment program 13. In the case that N is zero, that is, ST4 is equal to ST5, the competition testing apparatus 1 does not make any CPU execute the timing adjustment program 13. The competition testing apparatus 1 stores a result of judgment, for example, as a flag value of a judgment flag. After the loop frequency has been set, the competition testing apparatus 1 returns to judgment on the CPU at step S12. After judgment on the CPU, the competition testing apparatus 1 makes one of the CPUs 4 and 5 execute the timing adjustment program 13 on the basis of the flag value of the judgment flag (S13).

It may become possible to provide the competition testing apparatus 1 that favorably makes the access competition occur by repetitively executing the access competing test program 9 while shifting the timings at which the CPUs make requests that the access competing test program be read out from each other until the access competition occurs as mentioned above with no installation of the false access signal generating means.

Figure 4:
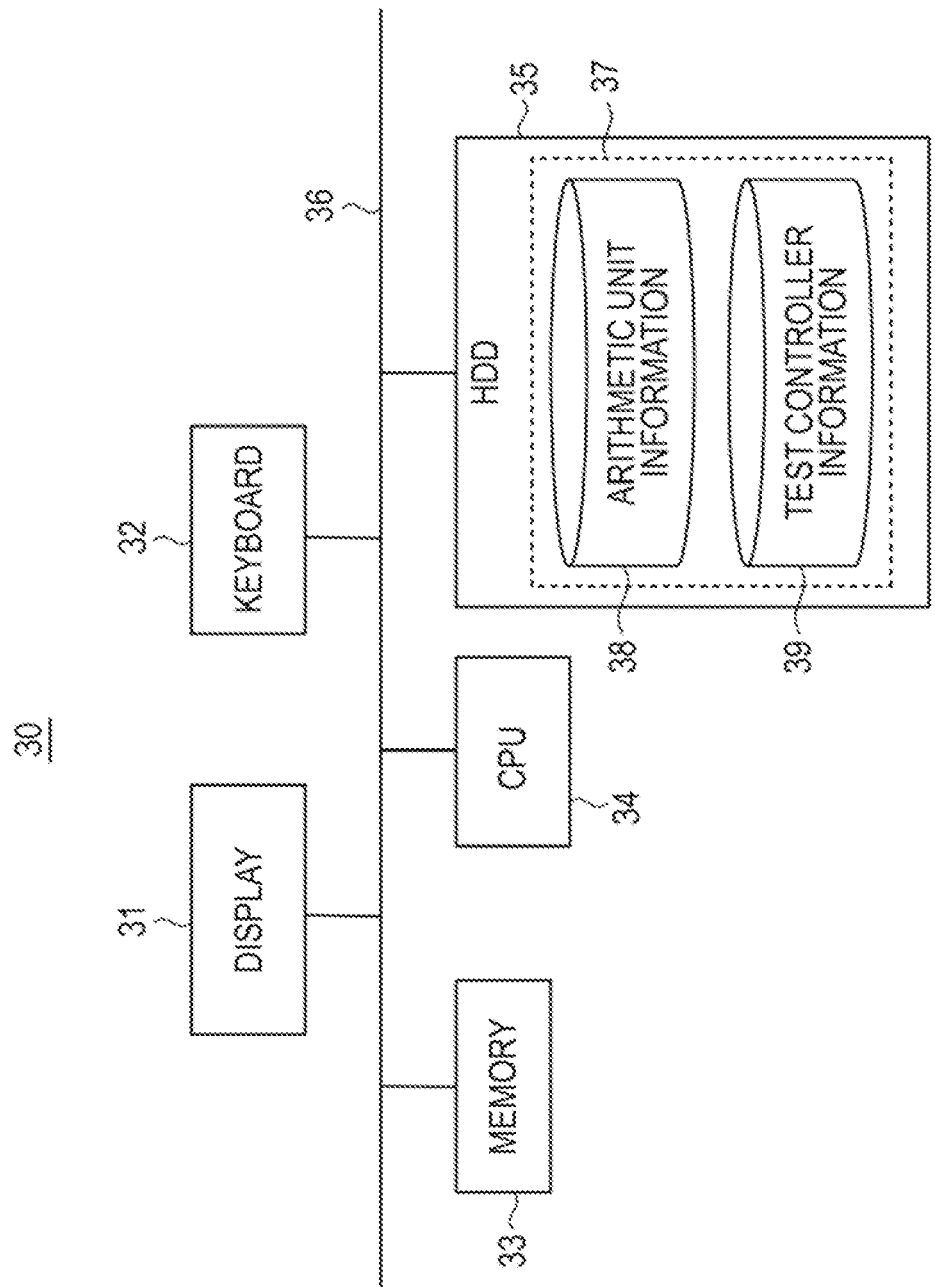
FIG. 4 is a block diagram illustrating an example of a computer that executes an access competing test of an arbitrator.

FIG. 4 is a block diagram illustrating an example of a computer 30 that executes the access competing test of the arbitrator 6. The computer 30 executes an application which is called an emulator. The emulator is a kind of application that operates in a computer. The emulator is allowed to operate the arithmetic unit 2 in a program of the computer 30 on the basis of circuit design information of the arithmetic unit 2. The computer 30 is allowed to execute the access competing test of the arithmetic unit 2 at the design stage of the arithmetic unit 2 by using the emulator.

The computer 30 includes a display 31, a keyboard 32, a memory 33, a CPU 34, an HDD 35 and a bus 36.

The HDD 35 is an example of a storage that stores programs that the CPU 34 executes and data on results of execution of the programs. The HDD 35 stores an emulator 37. The emulator 37 is executed using the CPU 34. As an alternative, a part of the emulator 37 may be temporarily stored in the memory for acceleration of a process executed using the CPU 34.

The emulator 37 includes arithmetic unit information 38 which is design information of the arithmetic unit 2 and competition testing apparatus information 39 which is design information of the competition testing apparatus 1. The arithmetic unit information 38 and the competition testing apparatus information 39 are described in a hardware description language such as, for example, the Verilog language or the like. The competition testing apparatus information 39 in the HDD 35 may store the access competing test program. The CPU 34 executes the emulator 37 to write the access competing test program into a virtual memory area in the arithmetic unit information 38. The CPU 34 executes the emulator on the basis of the competition testing apparatus information 39 to operate as the controller 14. The CPU 34 makes the virtual arithmetic unit 2 which is configured on the basis of the arithmetic unit information 38 execute the access competing test program which is written into the virtual memory area.

The display 31 is an example of a display unit that displays a result of the access competing test executed using the emulator. The display 31 visualizes and displays the arithmetic unit information 38 and the competition testing apparatus information 39.

The keyboard 32 is an example of an input unit that inputs analysis conditions of the access competing test executed using the emulator or the like into the computer 30. The memory 33 temporarily stores the emulator and a result of the access competing test that the CPU 34 has calculated. The memory 33 operates as the storage 15 of the competition testing apparatus 1.

The display 31, the keyboard 32, the memory 33, the CPU 34 and the HDD 35 are connected with one another via the bus 36.

As described above, it may become possible to virtually execute the access competing test of the arithmetic unit 2 at the design stage thereof by executing the access competing test program 9 using the computer 30 on the basis of the arithmetic unit information 38 and the competition testing apparatus information 39.

The emulator 37 that describes processing contents may be recorded in a computer readable recording medium. As the computer readable recording media, magnetic recording devices, optical disks, semiconductor memories and the like may be given by way of example.

In the case that a program is to be distributed, for example, a portable storage medium such as a DVD, a CD-ROM or the like that records the program is used. As an alternative, the program may be stored in a storage unit of a server computer to transmit the program from the server computer to another computer over a network.

FIG. 5A and FIG. 5B are diagrams illustrating examples of timing charts explaining occurrence of the access competition between the two CPUs 4 and 5. In each timing chart, numerals in the timing chart are addresses of memory blocks that each CPU reads out. The addresses of the memory blocks are expressed in hexadecimal numbers.

FIG. 5A indicates addresses of the access competing test program 9 that the CPUs 4 and 5 read out of the memory 8 in execution of the access competing test. FIG. 5B indicates a state in which the address of the memory block of the access competing test program 9 that the CPU 4 reads out of the memory 8 competes with the address of the memory block of the access competing test program 9 that the CPU 5 reads out of the memory 8.

In the example illustrated in FIG. 5A, a time waveform CPU4 indicates addresses of memory blocks that the CPU 4 reads out of the memory 8. The CPU 4 starts reading-out of addresses starting from an address 1000. The CPU 4 reads out the address of the next memory block while adding addresses in units of 32 bits.

In the example illustrated in FIG. 5A, a time waveform CPU5 indicates addresses of memory blocks that the CPU 5 reads out of the memory 8. The CPU 5 starts reading-out of addresses starting from an address 2000. The CPU 5 reads out the address of the next memory block while subtracting addresses in units of 32 bits.

FIG. 5B indicates a state in which the memory block that the CPU 4 reads out competes with the memory block that the CPU 5 reads out at a time T. The CPU 4 and the CPU 5 simultaneously make requests that an address 1800 be read out at the time T.

At a time before the time T, the arbitration section 6 outputs one competition signal 12 indicating that the access competition does not occur. When the access competition occurs at the time T, the arbitrator 6 outputs another competition signal 12 indicating that the access competition has occurred. When the address competition has occurred, the arbitrator 6 performs the arbitrating operation which has been defined in advance. After the time T, the arbitrator 6 again outputs the competition signal 12 indicating that the access competition does not occur.

It may become possible to provide the competition testing apparatus 1 that favorably makes the access competition occur by reading out an odd number of memory blocks using the CPU 5 in order reverse to order in which the CPU 4 reads out the memory blocks as described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A competition testing apparatus for testing an access competition of an arithmetic unit, the competition testing apparatus comprising:
  a memory that stores an odd number of test programs;
  a first processor that accesses the memory to read a test program stored in the memory and executes the test program;
  a second processor that accesses the memory to read the test program stored in the memory and executes the test program;
  a controller that controls the first processor to read and execute the test programs stored in the memory in a specified order, and controls the second processor to read and execute the test programs stored in the memory in an order reverse to the specified order;
  an arbitration unit that arbitrates a transfer of a program stored in the memory upon accesses to a same address space in the memory by the first processor and the second processor; and
  a recording unit that records the result of arbitration performed by the arbitrator.

2. The competition testing apparatus according to claim 1, wherein
  the arbitration unit outputs a competition signal when both the first processor and the second processor read the same address space in the memory, and shifts times at which the first and second processor read the test programs until the competition signal is detected.

3. The competition testing apparatus according to claim 1, wherein the controller shifts a timing at which either one of the first and second processors reads out the test programs on the basis of a difference between times at which the first and second processors read the test programs.

4. The competition testing apparatus according to claim 1, wherein
each of the first and second processors includes a temporal storage that temporarily stores the test programs read of the temporal storage, and
a capacitance value of each test program to be stored into the temporal storage is larger than a capacitance value of the temporal storage.

5. A competition testing method of testing an access competition of an arithmetic unit including a memory that stores a program, a first processor that executes the program by accessing the memory, a second processor that executes the program by accessing the memory, and an arbitration unit that arbitrates accessing the first processor and the second processor and reports a result of the arbitration upon the first processor and the second processor accessing a same address space in the memory, the method comprising:
   storing an odd number of test programs into the memory;
   controlling the first processor to process the test programs stored in the memory in a specified order;
   controlling the second processor to process the test programs stored in the memory in an order reverse to the specified order; and
   recording the result of arbitration performed using the arbitrator.

6. A computer-readable, non-transitory medium storing a competition test program of testing an access competition of an arithmetic unit including a memory that stores a program, a first processor that executes the program by accessing the memory, a second processor that executes the program by accessing the memory, and an arbitration unit that arbitrates accessing the first processor and the second processor and reports a result of the arbitration upon the first processor and the second processor accessing the same address space in the memory, the computer program causing a computer to execute a procedure, the procedure comprising:
   storing an odd number of test programs into the memory;
   controlling the first processor to process the test programs stored in the memory in a specified order;
   controlling the second processor to process the test programs stored in the memory in order reverse to the specified order; and
   recording the result of arbitration performed using the arbitrator.

* * * * *